(12) United States Patent
Smits et al.

(10) Patent No.: US 10,230,572 B2
(45) Date of Patent: Mar. 12, 2019

(54) SYSTEM AND METHOD FOR PROCESSING WEB-BROWSING INFORMATION

(71) Applicant: INSITE INNOVATIONS AND PROPERTIES B.V., Uden (NL)

(72) Inventors: David Smits, Uden (NL); Guido Budziak, Uden (NL)

(73) Assignee: INSITE INNOVATIONS AND PROPERTIES B.V., Uden (NL)

( * ) Notice: Subject to any disclaimer, the term of this patent is extended or adjusted under 35 U.S.C. 154(b) by 320 days.

(21) Appl. No.: 14/423,587

(22) PCT Filed: May 16, 2014

(86) PCT No.: PCT/NL2014/050308
§ 371 (c)(1),
(2) Date: Feb. 24, 2015

(87) PCT Pub. No.: WO2014/185782
PCT Pub. Date: Nov. 20, 2014

(65) Prior Publication Data
US 2015/0222481 A1    Aug. 6, 2015

(30) Foreign Application Priority Data
May 17, 2013  (NL) ..................... 2010823

(51) Int. Cl.
*G06F 15/177* (2006.01)
*H04L 12/24* (2006.01)
(Continued)

(52) U.S. Cl.
CPC .... *H04L 41/0806* (2013.01); *G06F 17/30312* (2013.01); *G06F 17/30864* (2013.01); *G06F 17/30893* (2013.01); *H04L 67/02* (2013.01)

(58) Field of Classification Search
USPC .............. 709/203, 213, 224, 219; 707/706; 711/135; 705/14.64
See application file for complete search history.

(56) References Cited

U.S. PATENT DOCUMENTS 6,826,594 B1 * 11/2004 Pettersen .......... G06F 17/30893
709/203
7,127,492 B1 * 10/2006 Calo ................... H04L 67/1008
709/213
(Continued)

FOREIGN PATENT DOCUMENTS

GB        2 425 194 A      10/2006

OTHER PUBLICATIONS

Schloss R J: "Novel business uses of independently created hyperlinks in the World Wide Web: basic mechanism and examples" Proceedings of the Annual Hawaii International Conference on System. Sciences, XX, XX, vol. 2, Jan. 3, 1996 (Jan. 3, 1996) pp. 137-146. XP002151364, cited in the application paragraph 2.1; p. 138 paragraph 2.5; p. 139 p. 141. left-hand column. paragraph 3 p. 142. left-hand column. line 4—last line p. 144. right-hand column. paragraph 2—paragraph 3.

(Continued)

*Primary Examiner* — Quang N Nguyen
(74) *Attorney, Agent, or Firm* — Young & Thompson

(57) ABSTRACT

The information processing platform (100, 200) includes:
  an auxiliary web server (11, 110);
  a back-end server (12, 120);
wherein the auxiliary web server is configured to:
  receive information relating to a web client (10, 150) query; and
  forward the information to the back-end server, and
(Continued)

wherein the back-end server is configured to:
  process the information according to instructions codified in a configuration file (14, 140); and
  store the processed information in the data storage.

20 Claims, 6 Drawing Sheets

(51) Int. Cl.
  *G06F 17/30* (2006.01)
  *H04L 29/08* (2006.01)

(56) References Cited

U.S. PATENT DOCUMENTS

| | | | | |
|---|---|---|---|---|
| 7,457,873 | B2 * | 11/2008 | Mariani | H04L 67/22 |
| | | | | 709/223 |
| 7,792,948 | B2 * | 9/2010 | Zhao | H04L 41/046 |
| | | | | 709/224 |
| 9,092,739 | B2 * | 7/2015 | Steck | G06N 99/005 |
| 2004/0054784 | A1 | 3/2004 | Busch et al. | |
| 2005/0216844 | A1 | 9/2005 | Error et al. | |
| 2011/0246440 | A1 * | 10/2011 | Kocks | G06F 17/30781 |
| | | | | 707/706 |
| 2012/0151016 | A1 * | 6/2012 | Wein | H04L 67/1008 |
| | | | | 709/219 |
| 2013/0346476 | A1 * | 12/2013 | Jasperson | H04L 67/142 |
| | | | | 709/203 |
| 2014/0006166 | A1 * | 1/2014 | Chiang | G06Q 30/0269 |
| | | | | 705/14.64 |
| 2015/0026412 | A1 * | 1/2015 | Eads | G06F 17/30902 |
| | | | | 711/135 |

OTHER PUBLICATIONS

International Search Report, dated Jan. 10, 2014, from corresponding PCT application.

* cited by examiner

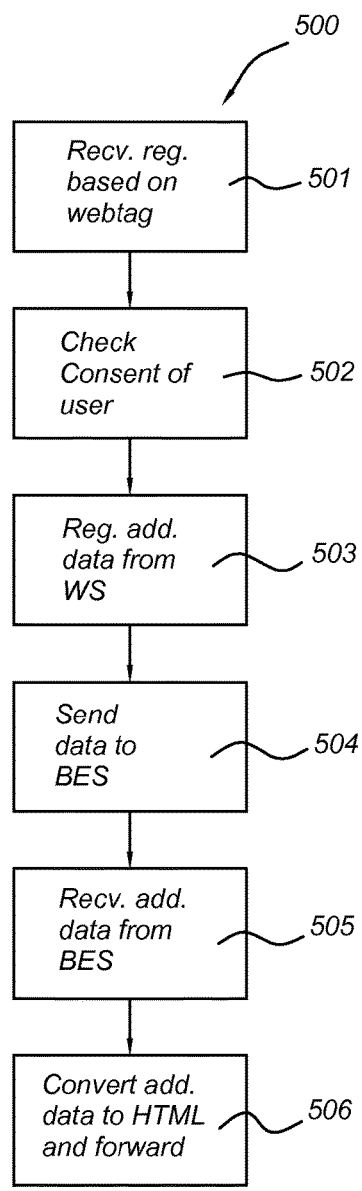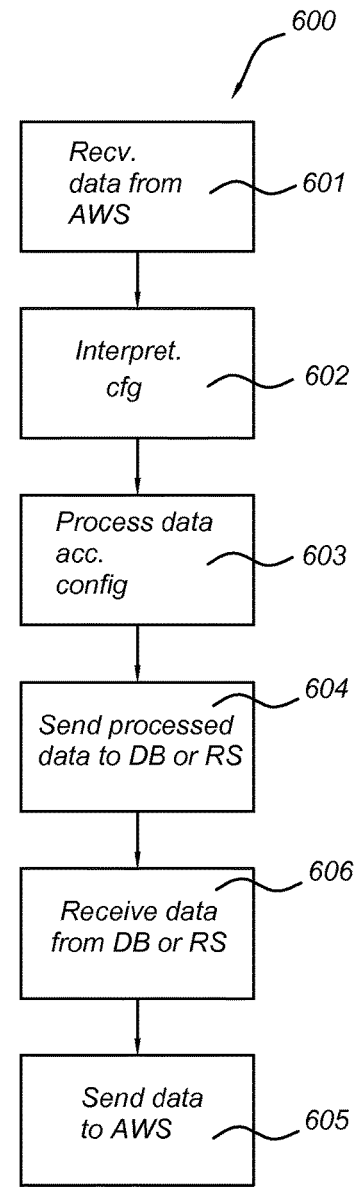

SYSTEM AND METHOD FOR PROCESSING WEB-BROWSING INFORMATION

FIELD OF THE INVENTION

The invention relates to system and method for processing web-browsing information. The invention also relates to a platform comprising an auxiliary web server and a back-end server, a method for processing information in an auxiliary web server, and a method for processing information in a back-end server.

BACKGROUND OF THE INVENTION

In principle, a single web server can provide all functionality to allow web browsers (clients) to access a web site. However, in recent years web sites have grown more complex, and so have web server systems.

For some years already it is customary to store the web site's content in a database, from which HTML pages are generated on the fly in response to a request. The system for serving web pages thus comprises a web server combined with a database backend. A different system may provide templates that indicate the look and feel of the website.

For large-scale web sites, in order to have redundancy and/or geographic distribution, distributed servers and database systems may be used, which adds further complexity to the design.

In recent years, more and more regulation relevant for web sites has appeared. National or trans-national regulation may stipulate if and how a web site may handle information related to people browsing the web. A common motivation of the regulation is to safeguard privacy of the people surfing the World Wide Web. For example, recent European regulation specifies the conditions for web sites to store so-called "cookies" (persistent information related to browsing) using a user's web browser.

Since the Internet does not generally stop at national borders, a web server administrator has to deal with many different regulations. It is naturally difficult for a web server to adhere to all regulations that may be relevant to any of its users. Accordingly, there is a need to handle personal or privacy related information in a structured fashion.

An article by R. J. Schloss, "Novel business uses of independently created hyperlinks in the World Wide Web: basic mechanism and examples" (Proceedings of the annual Hawaii international conference on system sciences, 1996) pp. 137-146, discloses an advisory server which, when provided with an URL of a page visited by a browser, can provide additional data on said visited page. The browser can then present the additional data along with the visited page. A disadvantage of this system is that it must be supported by the browser—in other words, the browser must, at its own initiative, explicitly request the additional information from the advisory server, using the Web Advisory Transmission Protocol (WATP). This requirement severely limits the use of the advisory servers, in particular for commodity devices with "off-the-shelf" browser software, such as connected appliances (so-called "Internet of Things" IoT devices).

SUMMARY OF THE INVENTION

The invention provides an information processing platform comprising:
  an auxiliary web server (AWS);
  a back-end server (BES);
wherein the auxiliary web server is configured to:
  receive information relating to a web client query; and
  forward the information to the back-end server, and
wherein the back-end server is configured to:
  process the information according to instructions codified in a configuration file to obtain processed information.

The platform may also comprise a data interface for providing processed data to e.g. a data storage for storing or a module for further processing, such as a recommender system. The information relating to a web client query can be personal or privacy-related information, relating to the user of the web client. In an embodiment, the web client requests a web page from a web server. The reply by the web server includes a web tag (for example, a piece of JavaScript code) that causes the receiving web client to contact the auxiliary web server. The information relating to a web client query can also include the URL of the requested web page and/or (parts of) the requested page.

The processed information may be stored in memory of the BES. The processed information may be provided to a data interface for further processing or storage, either internally or externally. In particular, the BES may provide the processed information to a data storage interface for storing the processed information.

It is to be understood that the entities of a platform according the invention (for example the auxiliary web server (AWS), back-end server (BES), data storage interface, etc) are logical entities and need not be physically separated. For example, it is possible to combine the AWS and BES in a single computer server, even in a single process on a single server. However, in order to clearly explain the invention, the AWS and BES will be discussed as logically separate entities. The data storage interface provides an interface for storing information in for example a local or remote data storage, such as a database unit. The data storage can be associated with the web server, for example it may be operated by the provider of the web server.

In a further embodiment according the invention, the platform further comprises a proxy server configured to:
  forward a request from a web client to a web server;
  receive a reply from the web server for the web client;
  send information based on the request and/or the reply to the auxiliary web server as information relating to a web client query.

In this further embodiment, the proxy server effectively hides the auxiliary web server from the web client. The platform then, advantageously, does not depend on a correct handling of the web tag by the client. Instead, the proxy server may handle the web tag and, based on the web tag received from the web server, contact the auxiliary server.

The contacting of the auxiliary web server by the web client or the proxy server may comprise sending the information relating to a web client query. It is also possible that this contacting only transmits partial information, and that further information is obtained by the auxiliary web server requesting further information from the web server.

In an embodiment according the invention, the forwarding of the information to the back-end server by the auxiliary web server is conditional on a check, by the auxiliary web server, of a privacy setting relating to the web client, such as the contents of a cookie. As part of this check, the AWS may also apply any relevant (local) legal requirements, thus removing the need for the operator of the web server to implement all legal requirements. Alternatively, the BES may implement the legal requirements check.

In an embodiment according the invention, the back-end server is configured to obtain the configuration file from a web server. The configuration file is typically provided by the operator of the web server. Therefore, it is convenient if the BES or the AWS automatically retrieves the configuration file from the web server.

In an embodiment according the invention, the configuration file specifies which elements of the information relating to the web client are to be aggregated in the processed information.

In an embodiment according the invention, the configuration file references data elements identified by HTML element identification.

In an embodiment according the invention, the configuration file comprises template SQL instructions for instructing a SQL database to store selected data.

In an embodiment according the invention, the auxiliary web server is configured to request additional data from a web server. In an embodiment according the invention, the configuration file is received from a web server or from a further remote server.

In an embodiment according the invention, the auxiliary web server is configured to process the data information relating to a web client query prior to forwarding the information to the back-end server.

In an embodiment according the invention, the auxiliary web server receives additional data from the back-end server after forwarding the information to the back-end server.

In an embodiment according the invention, the auxiliary web server is configured to send additional HTML data based on data received from a web server or the back-end server to the web client.

In an embodiment according the invention, the back-end server is configured to receive data from a data storage, for example through the data storage interface.

The invention further provides a method for processing information in an auxiliary web server, the method comprising:
 receiving a request including information relating to a web client query;
 checking user consent for processing the information;
 sending the information to a back-end server for processing and/or storage.

The received request can have been triggered by a web tag (for example a piece of JavaScript code) in a page from a web server. The web tag is interpreted and executed by a web client or a proxy server, which causes said request for the AWS to be issued.

The invention further provides a method for processing information in a back-end server, the method comprising:
 receiving information relating to a web client query;
 interpreting instructions codified in a configuration file
 retrieving information elements from the information according to the instructions;
 processing the retrieved information elements.
The processing of the information elements yields processed information that may be stored in a data storage. The processed information may be provided to a data storage interface for storing.

In an embodiment according the invention, interpreting the instructions codified in the configuration file comprises matching an URL comprised in the information relating to a web client query against a template in the configuration file. This advantageously allows the creator of the configuration file to specify several cases, one for each class (match) of web server pages.

In an embodiment according the invention, interpreting the instructions codified in the configuration file comprises
 extracting selected data from the information relating to a web client query and assigning said selected data to a named variable; and
 formatting selected named variables to obtain formatted output.

Advantageously, this allows the creator of the configuration file to specify, in a storage-medium independent manner, how the stored data is to be formatted.

BRIEF DESCRIPTION OF THE FIGURES

On the attached drawing sheets,

FIG. 5 schematically shows a flow chart for information processing by an auxiliary web server according to an embodiment of the invention;

FIG. 6 schematically shows a flow chart for information processing by a back-end server according to an embodiment of the invention;

In the figures, the same references refer to the same features.

DETAILED DESCRIPTION

Figure 1:
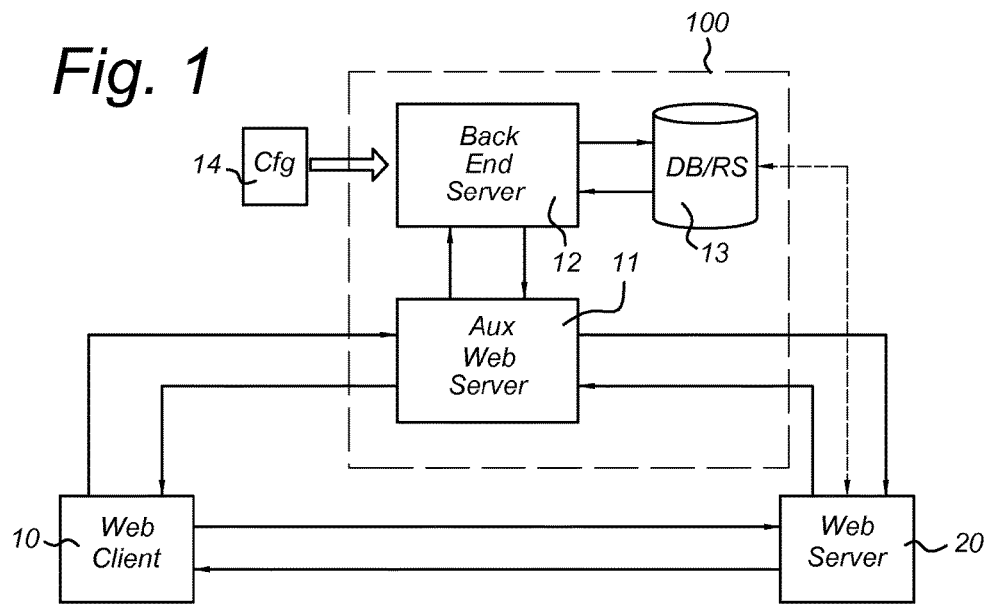
FIG. 1 schematically shows an information processing platform according to an embodiment of the invention.

FIG. 1 schematically shows an information-processing platform 100 according to an embodiment of the invention. The platform 100 comprises an auxiliary web server (AWS) 11, a back-end server (BES) 12 and a data storage or database (DB) 13. The entities indicated in FIG. 1 are logical entities. It is quite possible to integrate the entities in a single computer server, even implemented in a single software package. The platform 100 can also comprise separate devices, even multiple AWS and BES devices in order to create redundancy and/or increased processing power. The logical components of the platform 100 can be implemented using a wide array of hardware, operating system software, web server platforms, database systems, etc, available to the skilled person. The BES 12 is provided with a data storage interface for storing data. The data storage interface can be connected with data storage, such as a local or remote data storage. For example, data may be stored in a database unit 13 or in a server associated with the web server 20.

The network between the components can be any type of data network, such as a TCP/IP packet switched network. The web client 10 is typically a user terminal (e.g. a desktop computer, laptop, tablet, or other (portable) communications device) with web browser software (i.e. software able to interpret HTML and related standards, and able to communicate with a web server using HTTP). The web client 10 is able to communicate with a web server 20, preferably via HTTP over a TCP/IP network such as the Internet. Both the web client 10 and the web server 20 are able to communicate with auxiliary web server (AWS) 11.

The AWS 11 in turn is connected to a Back-end Server (BES) 12, which is configured to store data in and retrieve data from database (DB) 10. The Back-end Server receives as input a configuration file 14. The network connecting the AWS 11 to BES 12 and BES 12 to DB 13 does not need to be directly accessible by client 10, and can thus be an intranet or virtual private network.

Figure 2:
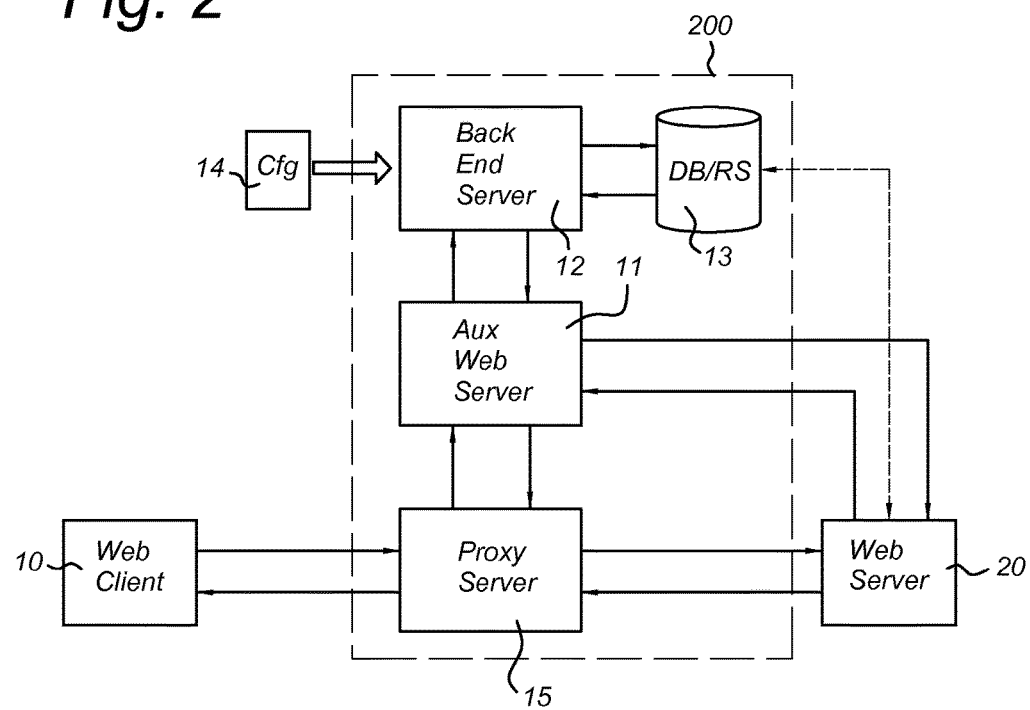
FIG. 2 schematically shows an information processing platform comprising a proxy server according to an embodiment of the invention.

FIG. 2 schematically shows another information processing platform 200 comprising a proxy server 15 according to an embodiment of the invention. Most of the logical components have already been described in reference to FIG. 1, so their description need not be repeated here. The main difference with platform 100 of FIG. 1 is that now a proxy server is located between the web client 10 and the web server 20. All traffic between client 10 and server 20 goes through the proxy server 15. The proxy 15 is also able to communicate with the AWS 11. In this case, the web client 10 does not need to reach the AWS directly, as all web client 10 requests for the AWS 11 will be handled via the proxy 15.

The AWS 11, BES 12, and DB 13 making up platform 100 or the AWS 11, BES 12, DB 13, and proxy server 15 making up platform 200 may be operated by a single service provider. The web server 20 (which can represent a single server, a server farm, or a globally distributed network of related content servers) is operated by a site operator who will enlist the services of the service operator for certain functionality of the web server 20, for example for the correct implementation of storage and retrieval of personal (privacy-related) data.

A hybrid form of the embodiments of FIGS. 1 and 2 is also possible. In this hybrid form, a proxy server 15 is provided as described in reference to FIG. 2. The proxy server can handle some parts of the communication with the AWS 11 based on instructions received from the web server 20. However, some web tags are handled by the web client 10, so the web client 10 can also contact AWS 11. Advantageously, the web client is only used for providing localized data (for example, related to browser events such as UI interactions by a user) which is only available on the client device and not in the proxy.

More detailed functions of the various logical components will be further described in reference to the FIGS. 3-7.

Figure 3:
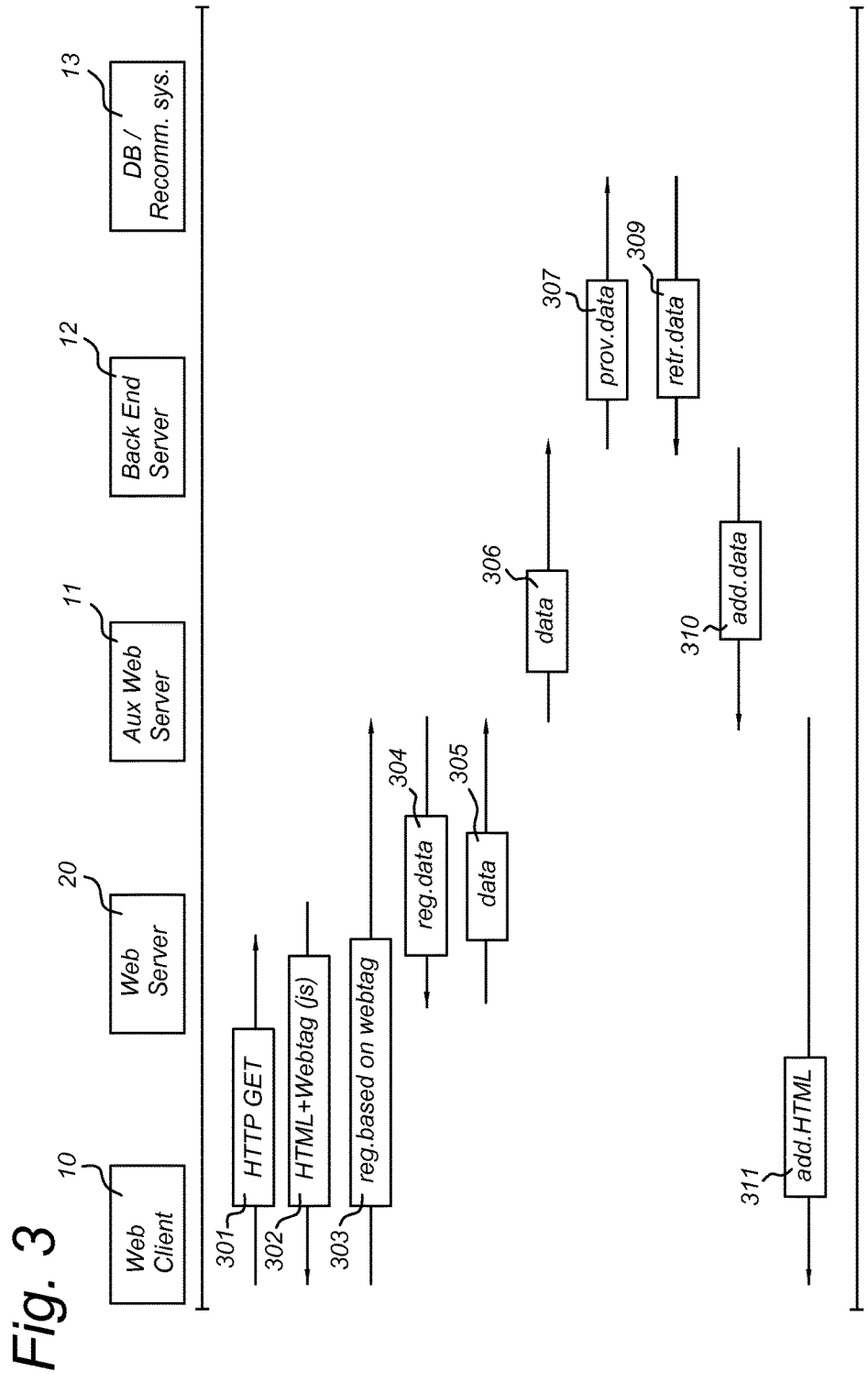
FIGS. 3 and 4 schematically show communications between various entities in an information processing platform according to an embodiment of the invention.
Figure 4:
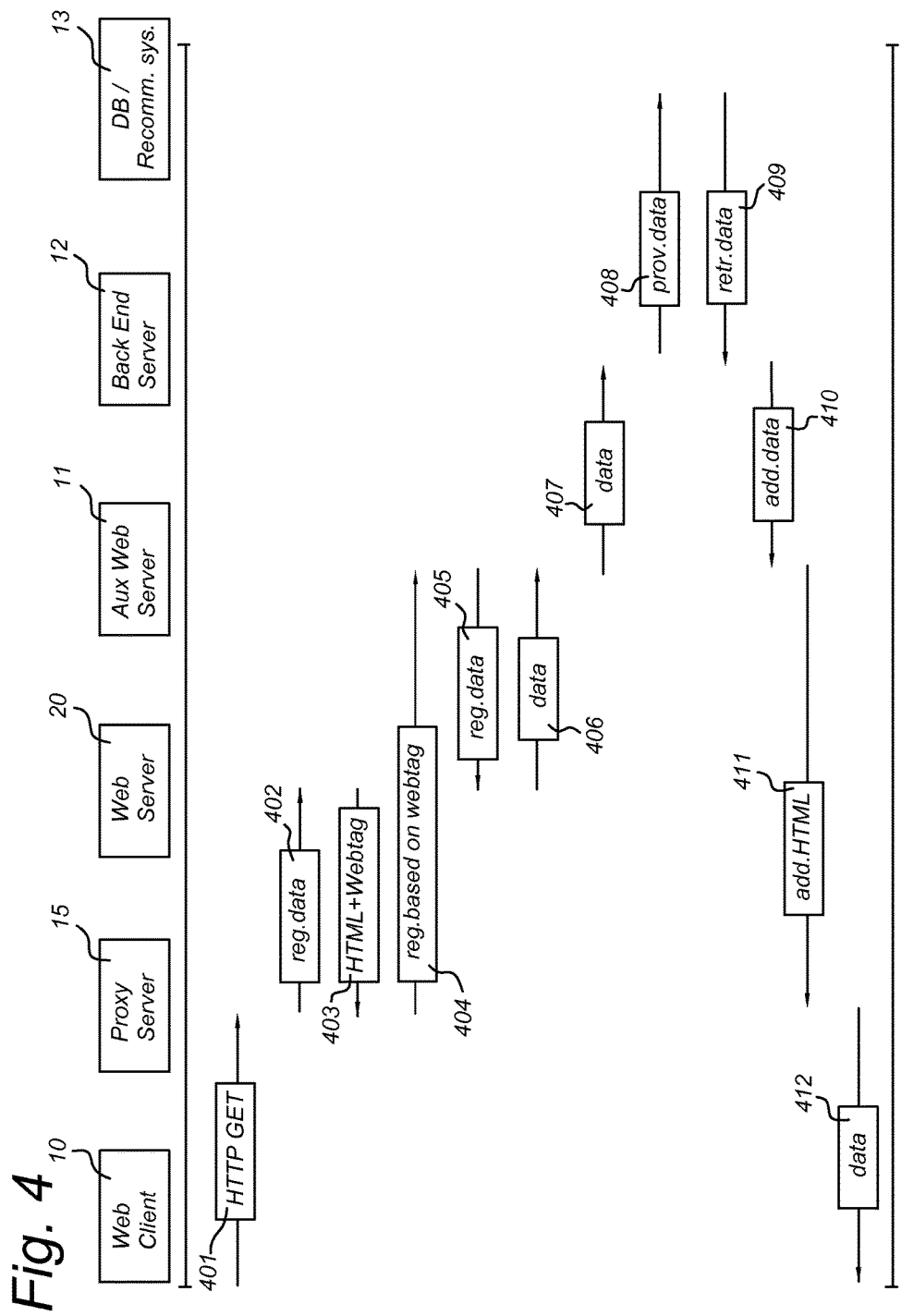

FIGS. 3 and 4 schematically show communications between various entities in an information-processing platform 100 and 200, respectively, according to an embodiment of the invention.

In step 300, the web client requests a page from a web server 20. In step 302, the web server 20 responds with the requested page, which includes a web tag element. The web tag element can for example be a piece of JavaScript code, included in appropriate HTML tags, to be executed by the web client 10. More generally speaking, a web tag element is an element that causes a web client 10 or suitable adapted proxy server 15 to initiate a contact with an auxiliary web server 11. The web tag will typically be provided by the service provider of platform 100, 200 for inclusion in pages generated by the web server 20. The web client 10 evaluates the web tag (for example, it executes the JavaScript code of the web tag), and as a result of the evaluation is caused to send, in step 303, a request to the auxiliary web server 11. The request may for example include personal data (such as a user name, real name, email address, cookie contents, etc) or session data (for example cookie contents, page URL, elements of the currently requested web page, etc). The request can include data related to browser events (e.g. UI interactions by the user).

As a result of the request by the client device, in step 304 the AWS 11 may retrieve further data from the web server. The further data can include for example any one or more of: a configuration file 14 for later use by the BES, further personalized data (e.g. a real name based on a supplied username), and privacy permission settings. In step 305, the web server 20 supplies the requested data.

In step 306, the AWS 11 checks the privacy settings, for example by checking the contents of a cookie obtained via reply 303 or by checking the further data received in step 305. If the privacy settings allow the AWS 11 to continue, a request is submitted, also in step 306, to the Back-End Server 12 to process the information included in the request. The request may include all personal data available to the AWS 11, i.e. the sum of replies 303 and 305 if available.

The BES 12 evaluates the configuration file 14 in order to determine which information to process and/or store. In an advantageous embodiment of the invention, the configuration file 14 is a program script comprising rules on selecting data items and processing rules.

In step 307, the processed information is sent, via a storage interface, to DB 13 for storage. The processed data is not necessarily stored, it is also possible that the processed data is used as input in a recommender system and then discarded. Alternatively, only an excerpt of the processed data is stored, for example in the form of a log entry. In step 309, the DB may sent back additional data, for example, a confirmation, or statistical data related to the data just stored The BES 12 sends additional data, which may be based on the data received in step 309, to the AWS 11 in step 310. In step 311, the AWS may formulate a suitable HTML response to the request 303 received from the web client 10 and return it. The additional data in steps 309 or 310 may comprise statistical data from the database 13, an advertisement, or generally the output of a recommender system that operates on the basis of the processed information.

The flow illustrated in FIG. 4 is very similar to the flow of FIG. 3. The main difference is again that web client 10 does not directly communicate with either web server 20 or AWS 11, but via proxy 15. The proxy 15 acts, for the "outside world" of which web client 10 is a part, as the web server 20. The proxy thus receives the initial request 401 for a web page, which is forwarded to the actual web server 20 in step 402. Steps 401 and 402 combined thus have a similar effect to step 301 in FIG. 3. In step 403, the proxy receives the reply by the web server 20 (compare with step 302, where this reply is received by client 10). The proxy 15 now evaluates the web tag included in the reply and issues the required request in step 404 (compare with step 303 in FIG. 3) to AWS 11.

Steps 405 through 410 of FIG. 4 correspond to steps 304 through 310 of FIG. 3 and will not be described again. Steps 411 and 412 combined reach the same effect as step 311 in FIG. 3: the additional data received in step 410 is transmitted by AWS 11 as additional HTML to the proxy server 15. The proxy server inserts the HTML in the reply already received from the web server 20 in step 403, and returns the combined result to the web client in step 412.

An advantage of the flows of FIG. 4 and the platform 200 of FIG. 2 over the flows of FIG. 3 and the platform 100 of FIG. 1 is that in the former case the working of a system is not dependent on the correct evaluation of the web tag by the web client 10. In case a web client 10 is unable or unwilling (for example because JavaScript is not available or its functionality has been limited through configuration of the web client) to issue request 303, the system of FIGS. 1 and 3 fails. The proxy server, being controlled by the service provider of platform 200, can be expected to correctly issue request 404.

A disadvantage of platform 200 over platform 100 is that it requires that traffic for web server 20 is somehow (re) directed to the proxy server 15. While standard techniques exist to achieve this (e.g. redirection, Domain Name System modifications), this is an additional complication.

FIG. 5 schematically shows a flow chart for information processing by an auxiliary web server 11 according to an embodiment of the invention. In step 501, the AWS 11 receives a request based on a web tag (compare steps 303 and 404). The AWS 11 then checks, in step 502, the consent of the user. This may be done by checking a cookie. There are also other ways available to a skilled person for providing a user preference such as the user consent. The preference may for example be coded in the URL used in the request by the web client.

In step 503, the AWS 11 requests additional data from web server 20 (see steps 304, 405). Based on the received data and the outcome of the user consent check, the AWS 11 will send data (such as personal data) to the Back-end Server (504). The data may include a configuration file 14.

In step 505 data is received from the BES 12 (compare steps 310 and 410). In step 506, this data is converted to HTML and sent to source of the original request (either a web client 10 or a proxy 15, compare steps 311 and 411 respectively).

FIG. 6 schematically shows a flow chart for information processing by a back-end server 12 according to an embodiment of the invention.

In step 601, data (such as personal data) is received from AWS 11 (compare steps 306, 407). In step 602, the configuration file 14 is retrieved and interpreted (for more details see the description in reference to FIG. 7).

According the configuration file 14, the data is processed and may be partially or completely stored in database 13 in step 604. In step 605, a reply is received from the database 13, and in step 606 data, which may be based on the reply from the database, is sent to the AWS 11. Step 604 may also include sending the processed data to a recommender system for obtaining additional information based on the processed information. This additional information is then sent to the AWS in step 606. The recommender system can provide output based on various attributes, e.g. type of OS used (mobile, tablet, desktop/laptop, etc), browser type, user information, etc.

The database 13 disclosed in FIGS. 1-4 and mentioned in reference to FIG. 6 is but an example receiver of (processed) data from BES 12. In fact, the configuration file 14 may specify an arbitrary number of different output paths for data, called "flows". A standard log file, which may be stored in a database and/or displayed on a screen, is called the console flow. A further example of a predefined output path is a SQL data base—in this case the output path as references in the configuration file 14 indicates the address of the database and the table name where the data is to be stored. Another example of an output path or flow is the recommender system mentioned earlier.

Figure 7:
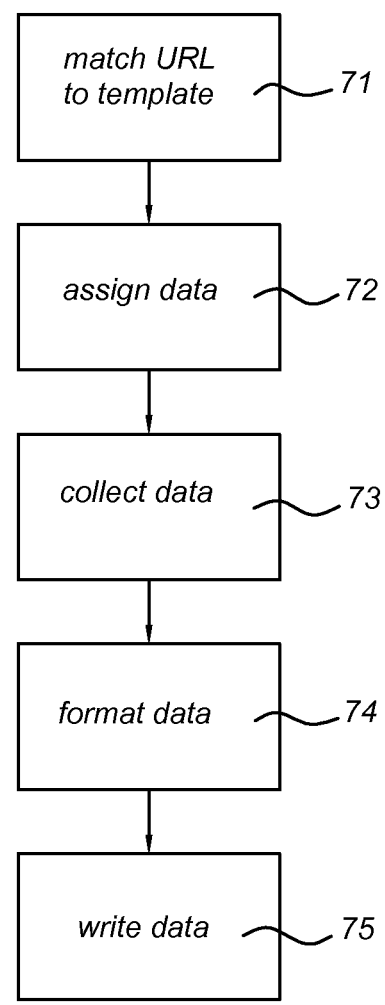
FIG. 7 schematically shows processing steps as described in a configuration file according to an embodiment of the invention.

FIG. 7 schematically shows a method of processing data corresponding to a configuration file 14 according to an embodiment of the invention.

The configuration file 14 comprises a number of sections called "concepts", with each section having its own processing rules. In step 71, the URL of the current page requested from web server 20 (or proxy 15, as the case may be) is matched against a template for each concept until a match is found. For example, a concept may be defined to match "*/index.html", indicating that the concept is applicable for any URL ending in "/index.html". If a matching concept is found, processing continues. The use of an URL in step 71 is but an example. Any data item related to a request from a web client can be used in the matching step. For example, a match can also be made based on a cookie value, a POST query, web browser event, etc. In general, in a first matching step 71, an object or event related to the web client is matched against a predetermined object or event, so that the system can determine the concept that is (most) appropriate.

In step 72, data is extracted from the available data and assigned to a named variable. For example, a JavaScript-like syntax of "document.getElementById('name')" may be used to extract data from the current page. The obtained data can be processed using standard scripting-language constructs, such as using a "substring(i, n)" function to obtain n characters starting at position i. Besides string manipulation functions, functions for arithmetic and date/time calculations are available, among others.

In step 73, selected assigned data is collected. In the simplest form, the full collection of every named variable is selected. More complex variants use conditional selection of data. For example, it is possible to select only data from users in a subscriber class or with a certain last name. This conditional check can be implemented by a Boolean expression involving one of the assigned named variables.

The collected data is formatted in step 74. For example, a basic formatting action can be to create Comma-Separated Value (CSV) text, or a SQL database row insertion command.

In step 75, the formatted data is written to one or more outputs. An output can for example be a log file (in database 13) or a console output. A more complicated example is to send the output via FTP to a remote file storage. Again, the specific output can be made conditional on the value of one or more variables.

The configuration file 14 thus allows a creator of such a file great freedom to specify exactly which data should be stored in what manner under which circumstances. In an advantageous embodiment, the configuration file 14 is created by the web server 20 operator and automatically retrieved, on demand, and cached by the AWS 11 or BES 12 from web server 20.

Figure 8:
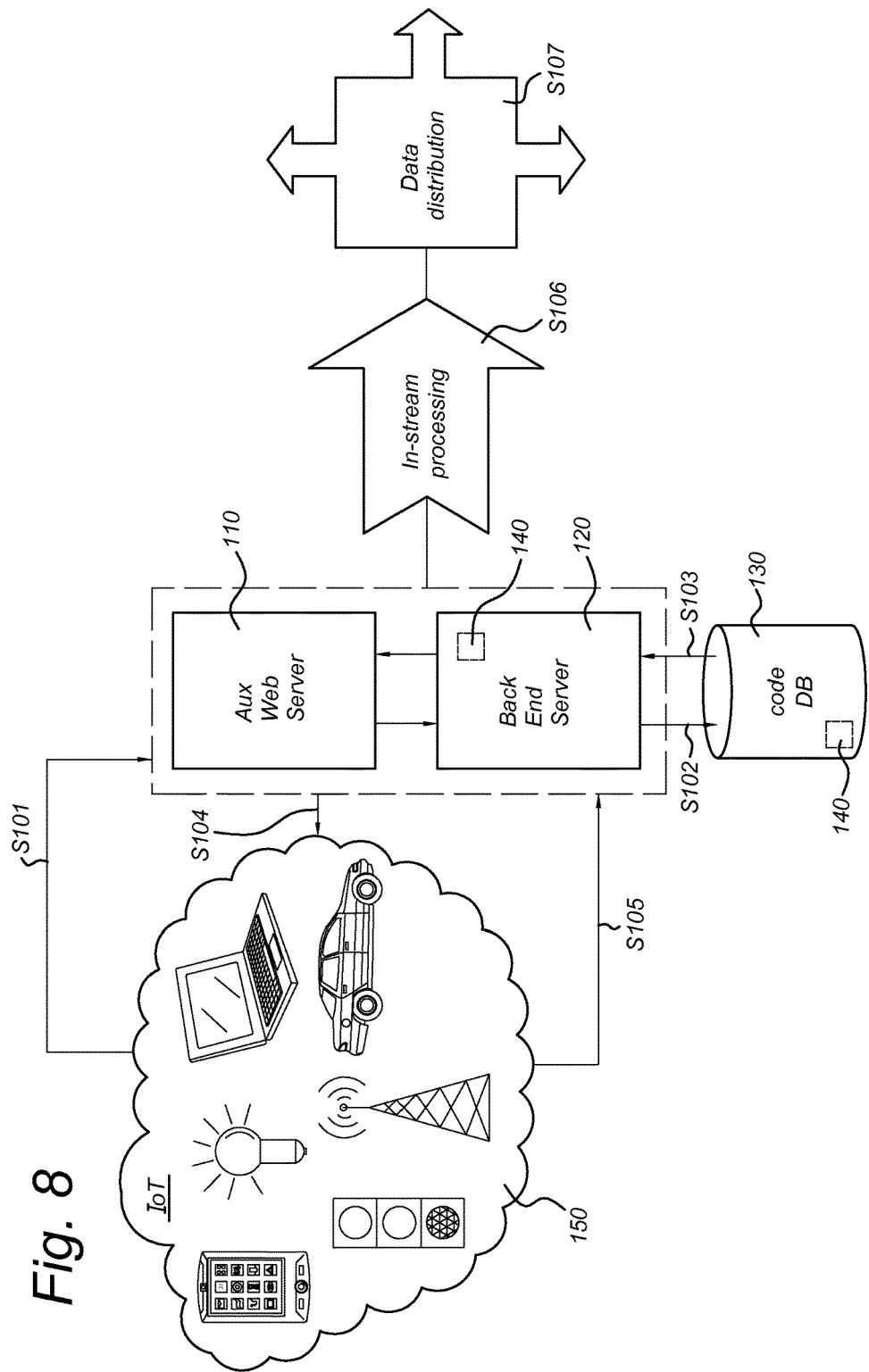
FIG. 8 schematically shows an information processing platform according to an embodiment of the invention.

FIG. 8 schematically shows an information processing platform according to an embodiment of the invention. In this embodiment, the web client 150 is a device in the so-called "Internet of Things", for example an appliance. The platform comprises an auxiliary web server 110, a connected back end server 120, and a connected code database 130. A configuration file 140 may be comprised anywhere in the platform, e.g. in the AWS 110, in the BES 120, or as part of the code in the code database 130.

In operation, the platform can be used as follows. Individual devices in the Internet of Things (IoT) regularly reports its status to the AWS 110 via a request (action S101). The request comprises a code request, which is a request for programming code that is specific to the requesting device. After receiving the request via the AWS 110, the BES 120 contacts the code database 130 for platform code to be executed for the requesting device (action S102). The database 130 provides the platform code, which is then interpreted by the AWS 110 or the BES 120 (action S103). The platform code may be embodied in configuration file 140. Based on this platform code, the AWS 110 or BES 120 builds client-specific code that is delivered to the device (action S104). This built code, which is client and device specific, instructs the device to execute specific behaviour and/or collect data (e.g. execute a defined sensor measurement). The collected data is pushed back to the platform for processing (action S105). The AWS 110 or BES 120 processes the collected data according to platform code, for example in an in-stream fashion (action S106). The processed data may be redistributed for storage or 3rd party services (action S107).

In this manner, an IoT platform service can be developed in a single compact code base, without the overhead of dealing with integrating many heterogeneous devices and dealing with the scalability of the system.

An embodiment of the invention can also be understood from the following. In an embodiment, the invention provides an environment including a (cloud based) computing system (AWS 11, 110 and BES 12, 120) with an associated platform language specification (the language of the configuration file 14, 140). A number of programs are stored in a code repository 13, 130. Challenges in the domain of Internet of Things (IoT) include communication and integration of functionalities, particularly over a heterogeneous array of devices towards a common system goal. In this setting the environment can provide strong advantages in dealing with the scalability of communication of a large number of devices and integration of a diverse set into a common platform. An individual device (web client) reports its status to the computation platform regularly. The logic behind this coupling of devices with the platform is done through a file, written in the platform language. Each report is accompanied by a code request. After receiving a request from the device, the platform contacts the code repository for platform code containing logic to be executed specific for this system. The repository provides the code, which is interpreted by the computing platform. Based on the code definition the platform builds client specific code that is delivered to the device. This code (which is client and device specific) instructs the device to execute specific behavior and/or collect data e.g. to execute defined sensor measurement. The collected data is pushed back to the computation platform for processing. The platform processes the collected data according to the defined code from the set of devices in an in-stream fashion and redistributes it further for storage or 3rd party services.

In an embodiment according the invention, the web client (or IoT device) requests a page from a web server. The web server inserts executable code in the reply. The executable code can be a single line of code (SLOC). The web client receives the reply and executes the included code. This execution can be automatic due to adherence of the web client to certain accepted standards, for example JavaScript. The execution of said code causes the web client to issue the code request (referenced above) to the computation platform. In that manner, a third party (operating the web server) can steer a web client towards the computation platform.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. An information processing platform comprising:
    a web server;
    an auxiliary web server; and
    a back-end server,
    wherein the web server includes an executable code in a requested web page, said executable code containing instructions to send information relating to a web client query to the auxiliary web server;
    wherein the auxiliary web server is configured to:
    receive the information from the web server relating to a web client query; and
    forward the information received from the web server to the back-end server, and
    wherein the back-end server is configured to:
    process the information, sent from the web server via the auxiliary web server, according to instructions codified in a configuration file to obtain processed information.

2. The platform according to claim 1, wherein the back-end server is configured to:
    provide the processed information to a recommender system for generating additional data to be sent to the web client.

3. The platform according to claim 1, wherein the back-end server is configured to:
    provide the processed information to a data storage interface for partially or completely storing the processed information.

4. The platform according to claim 1, further comprising a proxy server configured to:
    forward a request from a web client to the web server;
    receive a reply from the web server for the web client;
    send information based on the request and/or the reply to the auxiliary web server as information relating to a web client query.

5. The platform according to claim 1, wherein the forwarding of the information to the back-end server by the auxiliary web server is conditional on a check, by the auxiliary web server, of a privacy setting relating to the web client, such as the contents of a cookie.

6. The platform according to claim 1, wherein the back-end server is configured to obtain the configuration file from the web server.

7. The platform according to claim 1, wherein the configuration file specifies which elements of the information relating to the web client query are to be aggregated in the processed information.

8. The platform according to claim 1, wherein the configuration file references data elements identified by HTML element identification.

9. The platform according to claim 1, wherein the configuration file comprises template SQL instructions for instructing a SQL database to store selected data.

10. The platform according to claim 1, wherein the auxiliary web server is configured to request additional data from a web server.

11. The platform according to claim 1, wherein the configuration file is received from a web server.

12. The platform according to claim 1, wherein the auxiliary web server is configured to process the information relating to a web client query prior to forwarding the information to the back-end server.

13. The platform according to claim 1, wherein the auxiliary web server receives additional data from the back-end server after forwarding the information to the back-end server.

14. The platform according to claim 1, wherein the auxiliary web server is configured to send additional HTML data based on data received from a web server or the back-end server to the web client.

15. The platform according to claim 1, wherein the back-end server is configured to receive data from a data storage.

16. A method for processing information, the method comprising:
    including, by a web server, an executable code in a requested web page, said executable code containing instructions to send information relating to a web client query to an auxiliary web server;
    receiving from the web server, by the auxiliary web server, a request including the information relating to a web client query;
    the auxiliary web server retrieving a configuration file;
    the auxiliary web server checking user consent for processing the information received from the web server;
    the auxiliary web server sending the information received from the web server to a back-end server for processing and/or storage.

17. The method for processing information according to claim 16, further comprising:
    the back-end server receiving the information relating to a web client query from the auxiliary web serving, wherein the information relating to the web client query comprises information about a requested web page;
    the back-end server interpreting instructions codified in a configuration file;
    the back-end server retrieving information elements from the information according to the instructions; and
    the back-end server processing the retrieved information elements.

18. The method according to claim 17, wherein interpreting the instructions codified in the configuration file comprises:
    the back-end server matching a data item comprised in the information relating to a web client query against a value in the configuration file.

19. The method according to claim 18, wherein the data item comprised in the information relating to a web client query is an URL of the requested web page.

20. The method according to claim 17, wherein interpreting the instructions codified in the configuration file comprises:
    the back-end server extracting selected data from the information relating to a web client query and assigning said selected data to a named variable; and
    the back-end server formatting selected named variables to obtain formatted output.

* * * * *